US008172677B2

(12) United States Patent
Bleich et al.

(10) Patent No.: US 8,172,677 B2
(45) Date of Patent: May 8, 2012

(54) WAGERING GAMES USING MULTI-LEVEL GAMING STRUCTURE

(75) Inventors: Charles R Bleich, Cary, IL (US); Stephen A Canterbury, Antioch, IL (US); Eric M Pryzby, Skokie, IL (US); James M Rasmussen, Chicago, IL (US); Norman R Wurz, Des Plaines, IL (US)

(73) Assignee: WMS Gaming Inc., Waukegan, IL (US)

( * ) Notice: Subject to any disclaimer, the term of this patent is extended or adjusted under 35 U.S.C. 154(b) by 431 days.

(21) Appl. No.: 12/514,432

(22) PCT Filed: Nov. 5, 2007

(86) PCT No.: PCT/US2007/023260
§ 371 (c)(1),
(2), (4) Date: May 11, 2009

(87) PCT Pub. No.: WO2008/063391
PCT Pub. Date: May 29, 2008

(65) Prior Publication Data

US 2010/0075750 A1 Mar. 25, 2010

Related U.S. Application Data

(60) Provisional application No. 60/858,207, filed on Nov. 10, 2006.

(51) Int. Cl.
*A63F 13/00* (2006.01)
*A63F 13/12* (2006.01)

(52) U.S. Cl. ................................ 463/30; 463/35; 463/42

(58) Field of Classification Search .................... 463/30, 463/35, 42
See application file for complete search history.

(56) References Cited

U.S. PATENT DOCUMENTS 3,533,629 A 10/1970 Raven ............................ 463/18
(Continued)

FOREIGN PATENT DOCUMENTS

AU 199943487 A1 3/2000
(Continued)

OTHER PUBLICATIONS

McGuire, Thomas, "Creative Sound Blaster Extigy review," dated Jul. 9, 2002, accessed Feb. 2, 2007, 8 pages, http://www.techspot.com/reviews/hardware/extigy/, 7 pages.
"WAV," Wikipedia: the Freee Encyclopedia, accessed Aug. 3, 2007, <http://en.wikipedia.org/wiki/WAV> , 4 pages.
Weinert, Joe, "Entertainment Vehicles," International Gaming & Wagering Business, IGWB New '97 Games, Mar. 1997, pp. 11-12, 15-18, 5 pages.
Wilson, Tracy V., "How Sound Cards Work," How Stuff Works, first accessed Jul. 25, 2007, http://computer.howstuffworks.com/sound-card.htm, 7 pages.

(Continued)

*Primary Examiner* — Evan Pert
(74) *Attorney, Agent, or Firm* — Nixon Peabody LLP

(57) ABSTRACT

According to one aspect of the present invention, a gaming system is disclosed including at least one community display and a plurality of personal media terminals. The at least one community display is adapted to display a community event thereon. The plurality of personal media terminals has a player positioning device and a plurality of speakers. At least two of the plurality of speakers are positioned to provide frontal audio to the player positioning device and at least two of the plurality of speakers are positioned to provide rear audio to the player positioning device. The plurality of speakers is positioned so as to provide a 360-degree sound field relative to the player positioning device. The 360-degree sound field for each of the plurality of personal media terminals differs based on the location of the personal media terminal in relation to the community display.

21 Claims, 8 Drawing Sheets

U.S. PATENT DOCUMENTS

| | | | | |
|---|---|---|---|---|
| 3,628,829 | A | 12/1971 | Heilig | 297/217 |
| 4,522,399 | A | 6/1985 | Nishikawa | 273/143 R |
| 4,679,143 | A | 7/1987 | Hagiwara | 364/411 |
| 4,837,728 | A | 6/1989 | Barrie et al. | 364/412 |
| 5,133,017 | A | 7/1992 | Cain et al. | 381/71 |
| 5,143,055 | A | 9/1992 | Eakin | 128/33 |
| 5,259,613 | A | 11/1993 | Marnell, II | 273/138 A |
| 5,318,298 | A | 6/1994 | Kelly et al. | 273/122 R |
| 5,370,399 | A | 12/1994 | Liverance | 273/434 |
| 5,411,258 | A | 5/1995 | Wilson et al. | 273/86 B |
| 5,444,786 | A | 8/1995 | Raviv | 381/71 |
| 5,469,510 | A | 11/1995 | Blind et al. | 381/55 |
| 5,524,888 | A | 6/1996 | Heidel | 43/21 |
| 5,533,727 | A | 7/1996 | DeMar | 463/23 |
| 5,542,669 | A | 8/1996 | Charron et al. | 463/13 |
| 5,547,192 | A | 8/1996 | Ishibashi | 463/26 |
| 5,580,309 | A | 12/1996 | Piechowiak et al. | 463/16 |
| 5,655,961 | A | 8/1997 | Acres et al. | 463/23 |
| 5,695,188 | A | 12/1997 | Ishibashi | 273/143 R |
| 5,743,798 | A | 4/1998 | Adams et al. | 463/17 |
| 5,762,552 | A | 6/1998 | Vuong et al. | 463/25 |
| 5,775,993 | A | 7/1998 | Fentz et al. | 463/17 |
| 5,807,177 | A | 9/1998 | Takemoto et al. | 463/47 |
| 5,812,674 | A | 9/1998 | Jot et al. | 381/17 |
| 5,816,918 | A | 10/1998 | Kelly et al. | 463/16 |
| 5,828,768 | A | 10/1998 | Eatwell et al. | 381/333 |
| 5,833,538 | A | 11/1998 | Weiss | 463/21 |
| 5,838,808 | A | 11/1998 | Prosser | 381/388 |
| 5,851,148 | A | 12/1998 | Brune et al. | 463/25 |
| 5,876,284 | A | 3/1999 | Acres et al. | 463/25 |
| 5,941,773 | A | 8/1999 | Harlick | 463/16 |
| 5,951,015 | A | 9/1999 | Smith et al. | 273/358 |
| 5,971,271 | A | 10/1999 | Wynn et al. | 235/380 |
| 5,971,850 | A | 10/1999 | Liverance | 463/23 |
| 6,056,640 | A | 5/2000 | Schaaij | 463/4 |
| 6,068,552 | A | 5/2000 | Walker et al. | 463/21 |
| 6,088,461 | A | 7/2000 | Lin et al. | 381/104 |
| 6,089,663 | A | 7/2000 | Hill | 297/258.1 |
| 6,110,041 | A | 8/2000 | Walker et al. | 463/20 |
| 6,146,273 | A | 11/2000 | Olsen | 463/27 |
| 6,162,121 | A | 12/2000 | Morro et al. | 463/16 |
| 6,217,448 | B1 | 4/2001 | Olsen | 463/25 |
| 6,239,810 | B1 | 5/2001 | Van Hook et al. | 345/431 |
| 6,254,483 | B1 | 7/2001 | Acres | 463/26 |
| 6,302,790 | B1 | 10/2001 | Brossard | 462/20 |
| 6,308,953 | B1 | 10/2001 | Nagano | 273/143 R |
| 6,315,666 | B1 | 11/2001 | Mastera et al. | 463/31 |
| 6,319,125 | B1 | 11/2001 | Acres | 463/25 |
| 6,364,314 | B1 * | 4/2002 | Canterbury | 273/274 |
| 6,368,216 | B1 | 4/2002 | Hedrick et al. | 463/20 |
| 6,416,411 | B1 | 7/2002 | Tsukahara | 463/35 |
| 6,422,941 | B1 | 7/2002 | Thorner et al. | 463/30 |
| 6,471,589 | B1 | 10/2002 | Nagano | 463/21 |
| 6,505,772 | B1 | 1/2003 | Mollett et al. | 235/379 |
| 6,508,709 | B1 | 1/2003 | Karmarkar | 463/42 |
| 6,530,842 | B1 | 3/2003 | Wells et al. | 463/46 |
| 6,537,152 | B2 | 3/2003 | Seelig et al. | 463/30 |
| 6,561,908 | B1 | 5/2003 | Hoke | 463/35 |
| 6,564,108 | B1 | 5/2003 | Makar et al. | 700/17 |
| 6,575,829 | B2 | 6/2003 | Coleman et al. | 463/20 |
| 6,638,169 | B2 | 10/2003 | Wilder et al. | 463/35 |
| 6,676,514 | B1 | 1/2004 | Kusuda et al. | 463/24 |
| 6,780,103 | B2 | 8/2004 | Bansemer et al. | 463/7 |
| 6,805,633 | B2 | 10/2004 | Hein, Jr. et al. | 463/35 |
| 6,840,860 | B1 | 1/2005 | Okuniewicz | 463/35 |
| 6,843,723 | B2 | 1/2005 | Joshi | 463/25 |
| 6,843,725 | B2 | 1/2005 | Nelson | 463/40 |
| 6,848,219 | B2 | 2/2005 | Standard et al. | 52/6 |
| 6,848,996 | B2 | 2/2005 | Hecht et al. | 463/35 |
| 6,866,581 | B2 | 3/2005 | Martinek et al. | 463/16 |
| 6,928,413 | B1 | 8/2005 | Pulitzer | 705/41 |
| 6,935,946 | B2 | 8/2005 | Yoseloff et al. | 463/16 |
| 6,935,955 | B1 | 8/2005 | Kaminkow et al. | 463/35 |
| 6,942,574 | B1 | 9/2005 | LeMay et al. | 463/41 |
| 6,968,063 | B2 | 11/2005 | Boyd | 381/57 |
| 7,364,508 | B2 | 4/2008 | Loose et al. | 463/30 |
| 2001/0004607 | A1 | 6/2001 | Olsen | 463/26 |
| 2002/0037763 | A1 | 3/2002 | Idaka | 463/16 |
| 2002/0039919 | A1 | 4/2002 | Joshi et al. | 463/20 |
| 2002/0052230 | A1 | 5/2002 | Martinek et al. | 463/10 |
| 2002/0077170 | A1 | 6/2002 | Johnson et al. | 463/16 |
| 2002/0090990 | A1 | 7/2002 | Joshi et al. | 463/20 |
| 2002/0142825 | A1 | 10/2002 | Lark et al. | 463/16 |
| 2002/0142846 | A1 | 10/2002 | Paulsen | 463/43 |
| 2002/0151349 | A1 | 10/2002 | Joshi | 463/20 |
| 2002/0160826 | A1 | 10/2002 | Gomez et al. | 463/16 |
| 2003/0054881 | A1 | 3/2003 | Hedrick et al. | 463/29 |
| 2003/0064771 | A1 | 4/2003 | Morrow et al. | 463/16 |
| 2003/0073489 | A1 | 4/2003 | Hecht et al. | 463/35 |
| 2003/0073490 | A1 | 4/2003 | Hecht et al. | 463/35 |
| 2003/0073491 | A1 | 4/2003 | Hecht et al. | 463/35 |
| 2003/0100359 | A1 | 5/2003 | Loose et al. | 463/20 |
| 2003/0114214 | A1 | 6/2003 | Barahona et al. | 463/20 |
| 2003/0211881 | A1 | 11/2003 | Walker et al. | 463/20 |
| 2003/0220139 | A1 | 11/2003 | Peterson | 463/30 |
| 2004/0018867 | A1 * | 1/2004 | Manz | 463/20 |
| 2004/0029637 | A1 | 2/2004 | Hein, Jr. et al. | 463/35 |
| 2004/0053695 | A1 | 3/2004 | Mattice et al. | 463/42 |
| 2004/0082388 | A1 | 4/2004 | Simsek et al. | 463/43 |
| 2004/0136553 | A1 | 7/2004 | Lee et al. | 381/307 |
| 2004/0138889 | A1 | 7/2004 | Gilboy et al. | 704/270 |
| 2004/0142748 | A1 | 7/2004 | Loose et al. | 463/35 |
| 2004/0147316 | A1 | 7/2004 | Nagano | 463/35 |
| 2004/0156512 | A1 * | 8/2004 | Parker | 381/74 |
| 2004/0198485 | A1 * | 10/2004 | Loose et al. | 463/20 |
| 2004/0209685 | A1 * | 10/2004 | Lucchesi et al. | 463/35 |
| 2005/0277469 | A1 | 12/2005 | Pryzby et al. | 463/35 |
| 2006/0009285 | A1 | 1/2006 | Pryzby et al. | 463/30 |
| 2006/0052152 | A1 * | 3/2006 | Tedsen et al. | 463/16 |
| 2006/0068909 | A1 | 3/2006 | Pryzby et al. | 463/35 |
| 2006/0111169 | A1 * | 5/2006 | Hornik et al. | 463/16 |
| 2006/0135254 | A1 * | 6/2006 | Thomas | 463/25 |
| 2006/0205497 | A1 * | 9/2006 | Wells et al. | 463/29 |
| 2008/0176654 | A1 | 7/2008 | Loose et al. | 463/35 |

FOREIGN PATENT DOCUMENTS

| | | | |
|---|---|---|---|
| EP | 0 977 856 | B1 | 2/2000 |
| EP | 0 981 119 | A2 | 2/2000 |
| EP | 0 752 632 | B1 | 8/2001 |
| EP | 1 439 508 | A3 | 8/2004 |
| JP | 3-297483 | A2 | 12/1991 |
| JP | 5-31254 | | 2/1993 |
| JP | 7-289730 | A2 | 11/1995 |
| JP | 8-187351 | A | 7/1996 |
| JP | 8-266724 | | 10/1996 |
| JP | 9-299551 | A2 | 11/1997 |
| JP | 10-277213 | | 10/1998 |
| JP | 2000-210463 | A | 8/2000 |
| JP | 2001-000641 | | 1/2001 |
| JP | 2001-728 | | 1/2001 |
| JP | 2002-177452 | | 6/2002 |
| JP | 2002-263250 | | 9/2002 |
| JP | 2002-272903 | | 9/2002 |
| JP | 2003-919 | A2 | 1/2003 |
| JP | 2003-88614 | A2 | 3/2003 |
| JP | 2003-88615 | A2 | 3/2003 |
| JP | 2003-220271 | A2 | 8/2003 |
| JP | 2003-250981 | A2 | 9/2003 |
| JP | 2003-250982 | A2 | 9/2003 |
| JP | 2003-310872 | A2 | 11/2003 |
| WO | WO 00/17825 | A2 | 3/2000 |
| WO | WO 01/05477 | A2 | 1/2001 |
| WO | WO 01/05477 | A3 | 1/2001 |
| WO | WO 01/33905 | A2 | 5/2001 |
| WO | WO 01/33905 | A3 | 5/2001 |
| WO | WO 02/24288 | A2 | 3/2002 |
| WO | WO 02/24288 | A3 | 3/2002 |
| WO | WO 02/40921 | A3 | 5/2002 |

OTHER PUBLICATIONS

Written Opinion of the International Searching Authority dated May 7, 2008 for PCT/US2007/023260.

International Search Report dated May 7, 2008 for PCT/US2007/023260.

* cited by examiner

WAGERING GAMES USING MULTI-LEVEL GAMING STRUCTURE

CROSS REFERENCE TO RELATED APPLICATIONS

This application is a U.S. national stage of International Application No. PCT/US2007/023260, filed Nov. 5, 2007, which is related to and claims priority to U.S. Provisional Application No. 60/858,207 filed Nov. 10, 2006, both of which are incorporated herein in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to wagering games having a personalized infrastructure or personalized audio.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a “secondary” or “bonus” game that may be played in conjunction with a “basic” game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with “progressive jackpot” awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

In addition to the need to develop new types of bonus games and other wagering games, there also exists a need to develop new types of gaming experiences for players of wagering games. One type of gaming experience that has been introduced is a community game event, wherein a community game is displayed on a community display to a group of players seated at a plurality of gaming machines. This type of gaming event increases the camaraderie among players and adds an additional degree of excitement to the player’s gaming experience. However, there is a continuing need to develop new environments and gaming situations for community games as well as other types of gaming experiences.

SUMMARY OF THE INVENTION

According to one aspect of the present invention, a gaming system is disclosed comprising at least one community display and a plurality of personal media terminals. The at least one community display is adapted to display a community event thereon. The plurality of personal media terminals has a player positioning device and a plurality of speakers. At least two of the plurality of speakers are positioned to provide frontal audio to the player positioning device and at least two of the plurality of speakers are positioned to provide rear audio to the player positioning device. The plurality of speakers is positioned so as to provide a 360-degree sound field relative to the player positioning device. The 360-degree sound field for each of the plurality of personal media terminals differs based on the location of the personal media terminal in relation to the community display.

According to another aspect of the invention, a gaming system is disclosed comprising at least one community display and a plurality of personal media terminals. The community display is adapted to display a community event thereon and the plurality of personal media terminals is located in a plurality of rows facing the community display. The personal media terminals include a player interface for interacting with the community event. Each of the personal media terminals has personalized audio based on the location of the personal media terminal relative to the at least one community display.

According to yet another aspect of the invention, a gaming system is disclosed comprising at least one community display adapted to display a community event thereon. The community event includes a wagering game having a game board and a plurality of selectable locations on the game board. The gaming system further includes a plurality of personal media terminals having a player positioning device and a plurality of speakers. Each of the personal media terminals are associated with at least one of the plurality of selectable locations on the game board. Upon a selection of at least one of the plurality of selectable locations on the game board, the plurality of speakers that corresponds to the personal media terminal associated with the selected selectable location is activated.

According to a further aspect of the invention, a gaming system is disclosed comprising at least one community display adapted to display a community event thereon. The community display includes a plurality of screens. The gaming system also includes a plurality of personal media terminals having a player positioning device and a plurality of speakers. Each personal media terminal is associated with a respective one of the plurality of screens. The gaming system further includes a shuttered lens associated with each of the plurality of personal media terminals. The shuttered lens allows a player to view only the respective one of the plurality of screens associated with the personal media terminal.

Additional aspects of the invention will be apparent to those of ordinary skill in the art in view of the detailed description of various embodiments, which is made with reference to the drawings, a brief description of which is provided below.

Figure 1A:
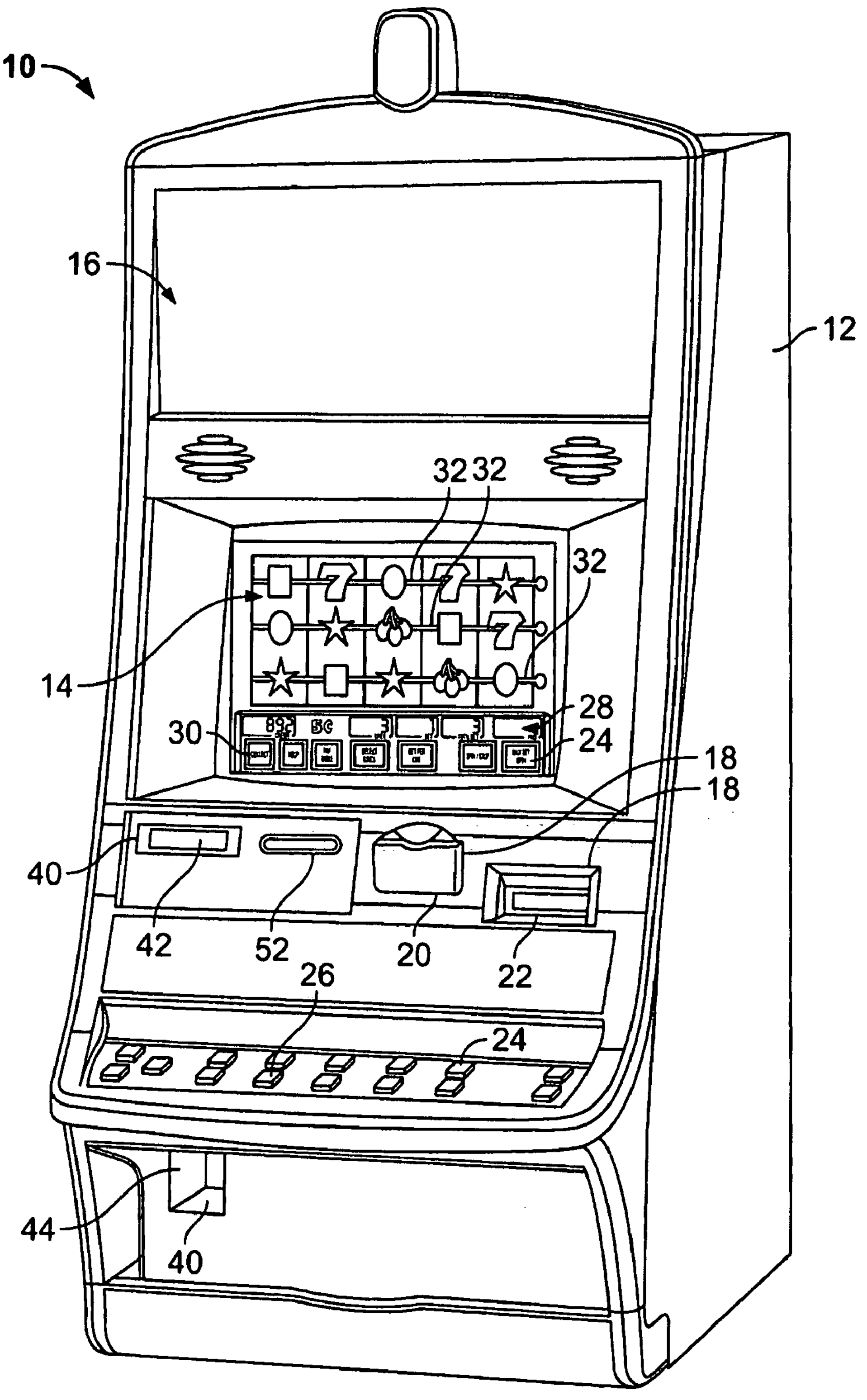
FIG. 1*a* is a perspective view of a free standing gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail various embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
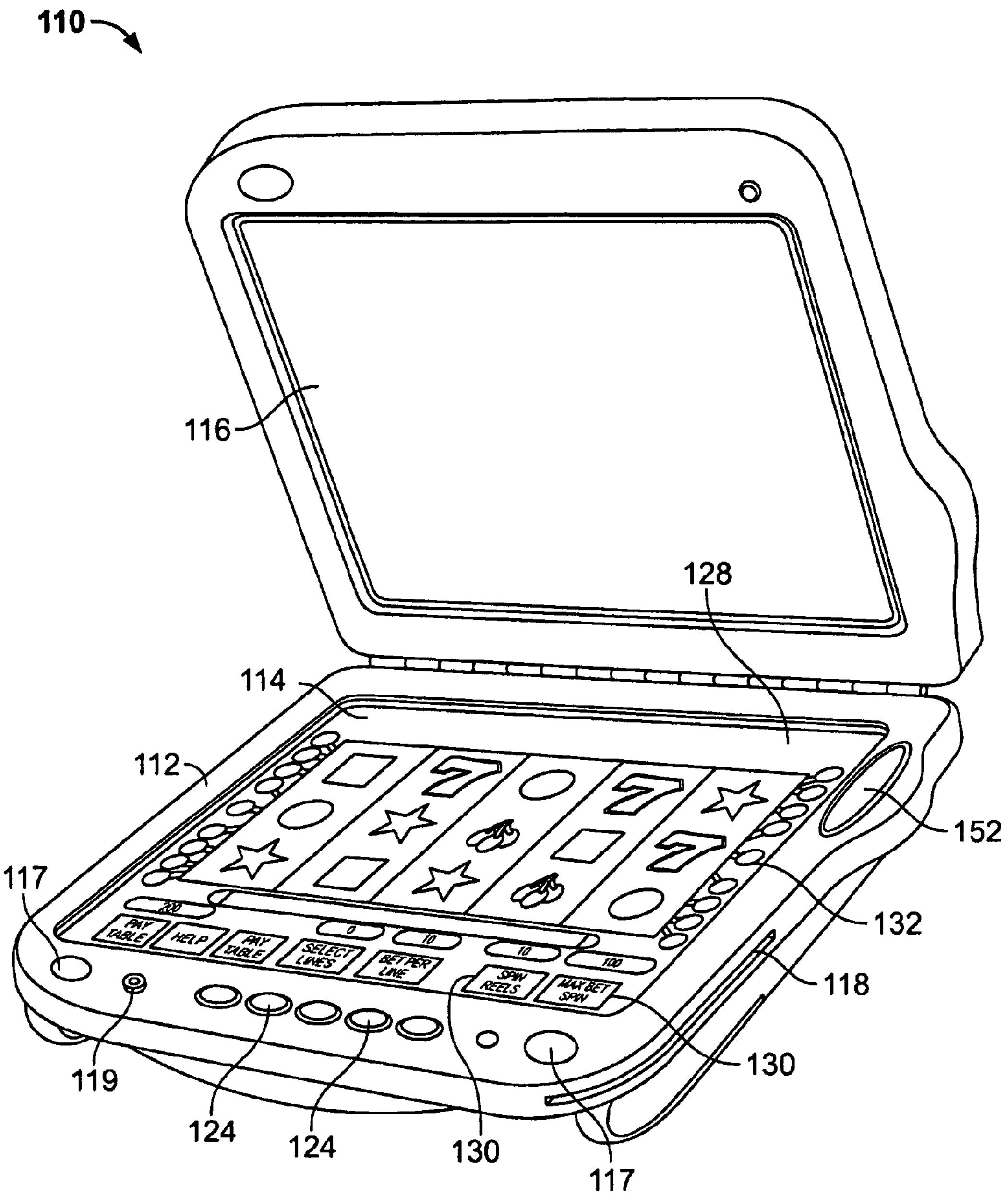
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game.

The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaining machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
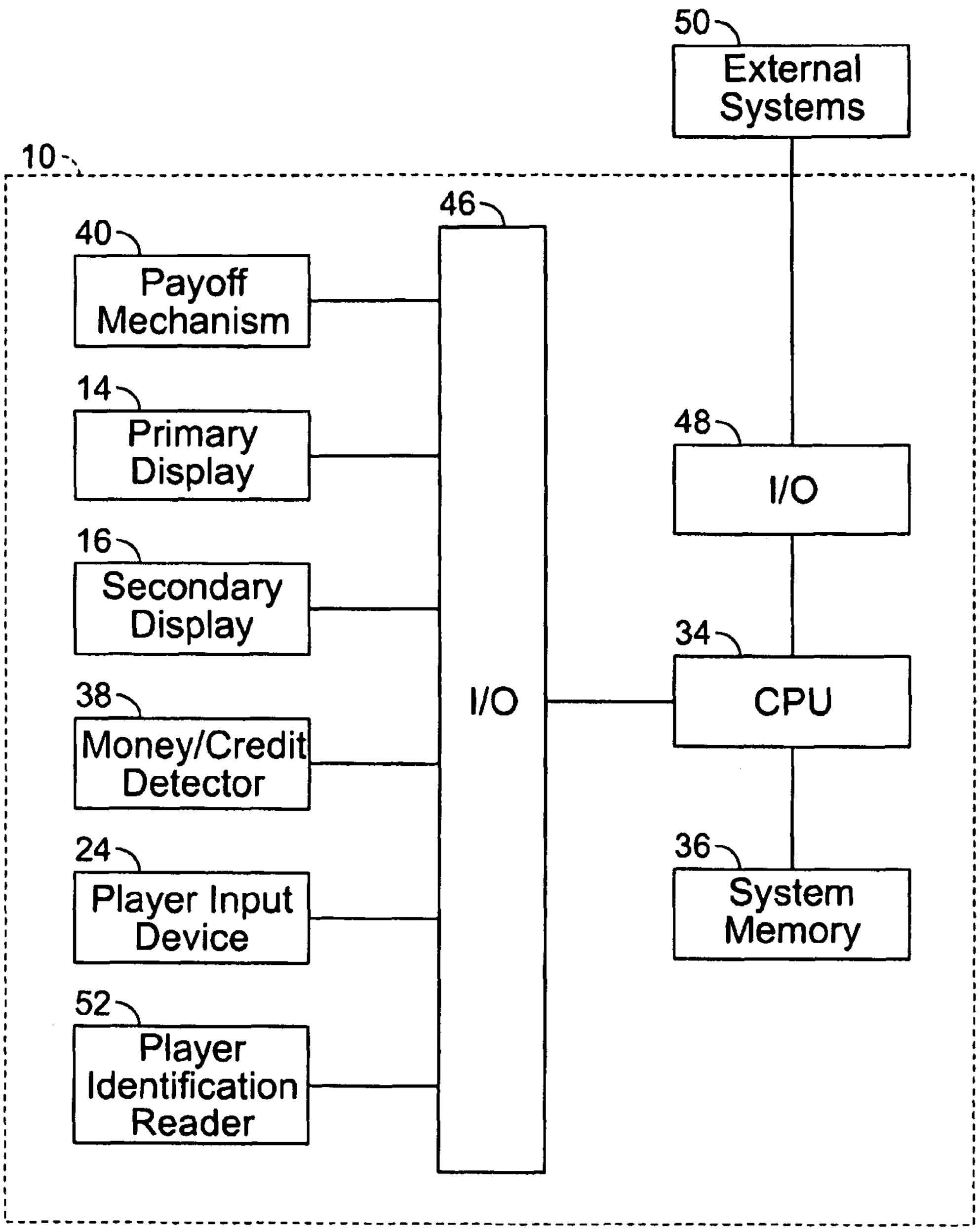
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
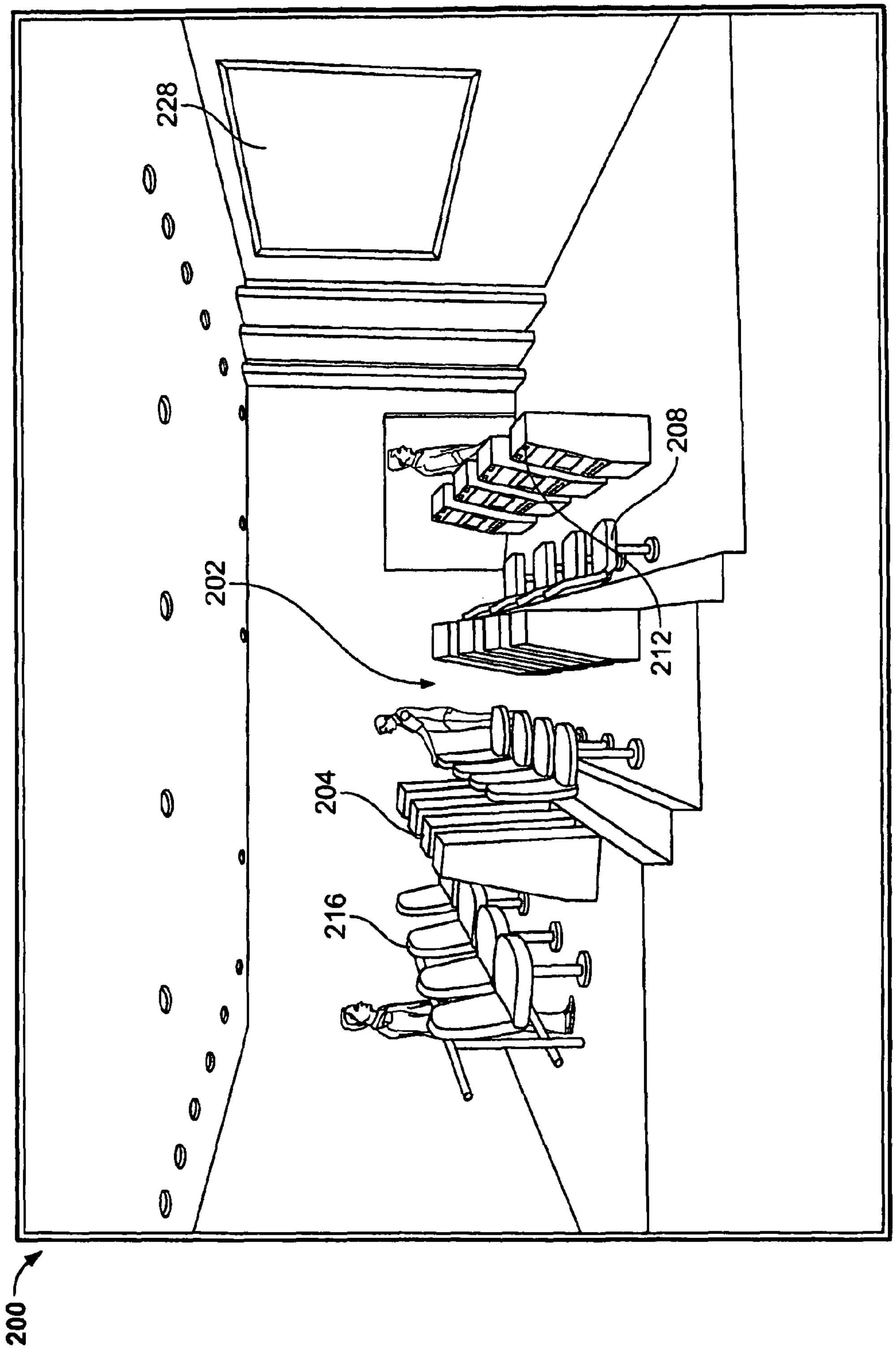
FIG. 3 is a perspective side view of a multi-level gaming structure, in accordance with one embodiment of the present invention.
Figure 4:
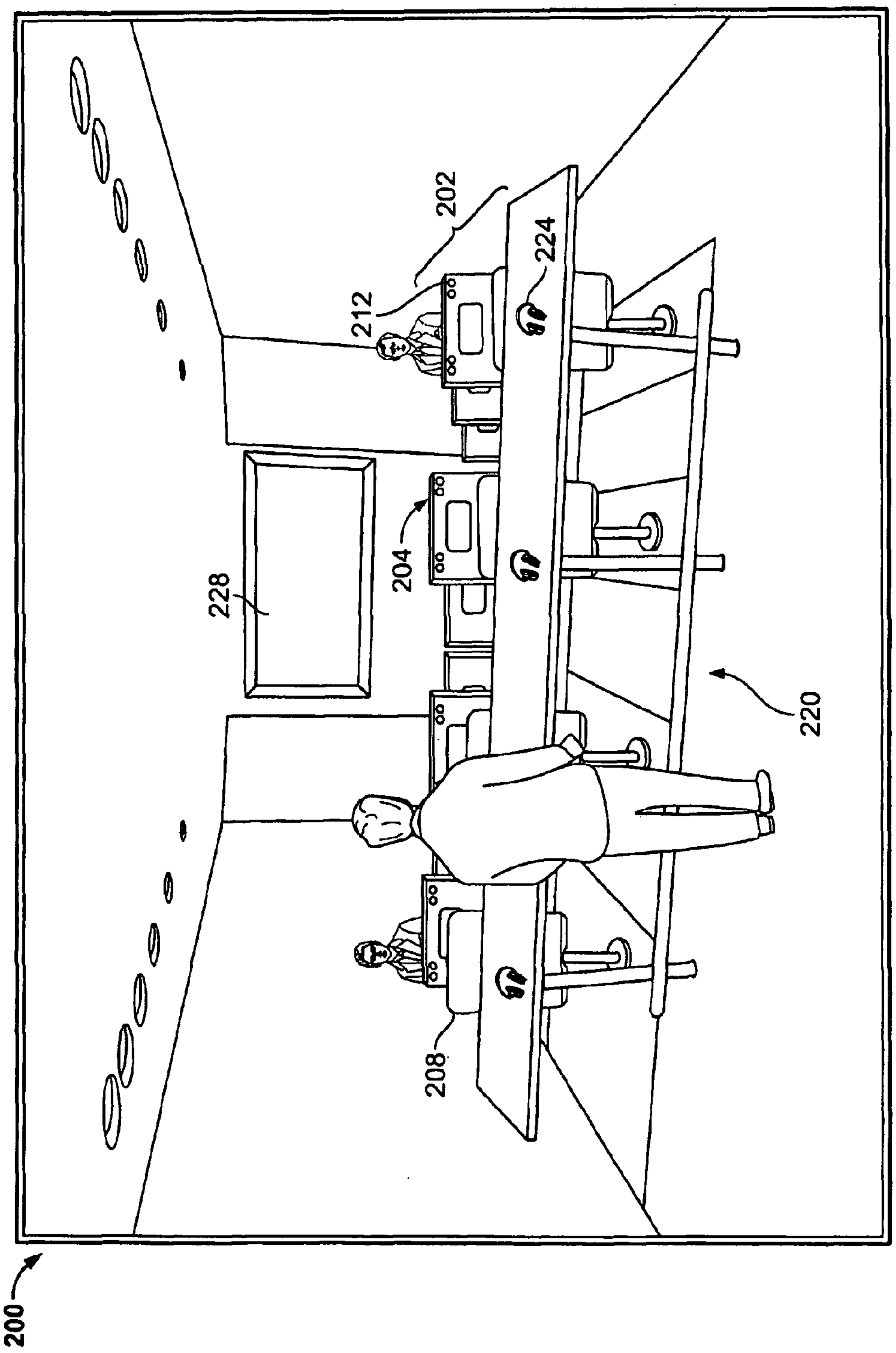
FIG. 4 is a perspective rear view of the multi-level gaming structure of FIG. 3.

Turning now to FIGS. 3-4, a multi-level gaming structure 200 is illustrated, according to one embodiment of the present invention. The multi-level gaming structure 200 may be an enclosed gaming environment separate from other gaming machines and foot traffic (i.e., in a room of its own). As illustrated, the multi-level gaming structure 200 has a theater-like setting and is enclosed on all sides and accessible only through one or more doorways. Alternatively, the multi-level gaming structure 200 may be an open environment such as a casino floor.

The multi-level gaming structure 200 includes a plurality of personal media terminals 202 arranged on multiple levels within the multi-level gaming structure 200. Each of the media terminals 202 includes a gaming shell 204 having a player positioning device 208, for example, a chair, associated with each of the gaming shells 204. Each of the gaming shells 204 may include electrical components, wiring, connection means, etc. therein. The gaming shells 204 may include a video display for displaying a wagering game or other content to a player. Alternatively, the gaming shells 204 may be adapted to connect to a handheld gaming machine 110 that serves as a display means for the gaming shell 204. In some embodiments, a gaming machine 10 (FIG. 1*a*) may serve as the gaming shell 204 within the personal media terminal 202 in the multi-level gaming structure 200.

The player positioning device 208 may be adapted to receive a handheld gaming machine 110. In these embodiments, the handheld gaming device 110 can serve as the player interface for the personal media terminal 202. The handheld gaming device may be attached to the player positioning device 208, the gaming shell 204, or may be in wireless communication with the personal media terminal 202. The handheld gaming machine 110 may be utilized with another display within the personal media terminal 202, a community display 228, or with additional player input devices.

Alternatively or additionally, the personal media terminal 202 may be equipped with a variety of input devices, such as, for example, pushbuttons, an LCD touch display, virtual reality gloves, joysticks, a mouse, a trackball, a pull-out control pad, etc. The personal media terminal 202 may be provided with a video display. In some embodiments, the video display is shrouded so as to prevent a player from viewing another player's screen.

The personal media terminals 202 may be adapted to directly receive a wager to play a wagering game. Alternatively, a "cover charge" may be required upon entrance to the multi-level gaming structure 200. The cover charge serves as the player's wager for the upcoming wagering game or games. Where a cover charge is utilized, the player may still be able to place additional wagers that may be directly received by the personal media terminals 202.

Figure 6:
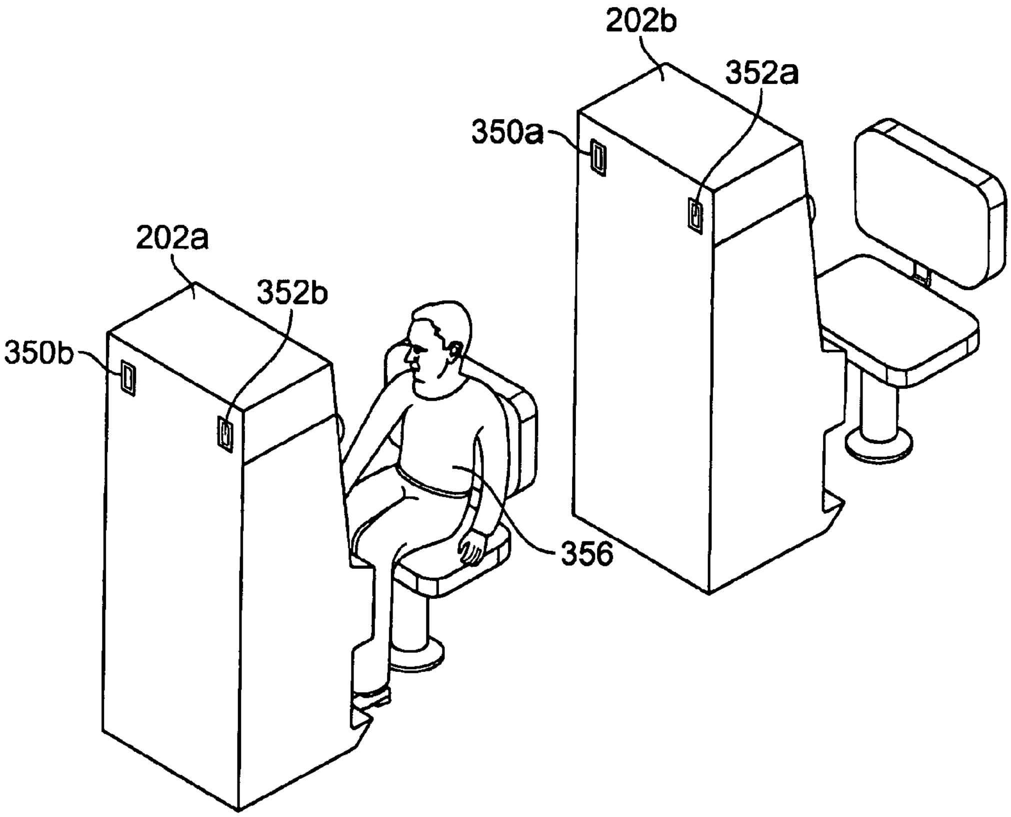
FIG. 6 is a perspective view of a plurality of personal media terminals, according to one embodiment.

The personal media terminals 202 provide personalized surround sound to a player utilizing the media terminal 202. In some embodiments, each of the plurality of gaming shells 204 includes a plurality of front speakers 212 positioned so as to be directed substantially towards the player positioning device 208. The player positioning devices 208 may include a plurality of rear speakers 216 directed substantially towards their associated gaming shell 204. The spatial relationship between the front speakers 212 and the rear speakers 216 creates a 360-degree sound environment around a focal point. Thus, a 360-degree sound field can be created around the player's head when the player is properly situated by the player positioning device 208. As will be further discussed below with respect to FIGS. 6-8, a variety of different speaker configurations may be utilized in various embodiments of the present invention.

The sound field may be adjusted and optimized based on the speaker distance and spatial relationship to the player's head. In some embodiments, the sound field is optimized based on the average distance and location from a player's head to the various speakers. The sound field may be adjusted immediately prior to conducting an event or during play of the event by sensing the positioning of a player's head or the position of the player positioning device 208. Infrared sensing may be used to determine the relative locations of the rear speakers 216 in relation to the front speakers 212 in embodiments where the player positioning device 208 may be adjusted by the player (and includes the rear speakers 216).

In some embodiments, the personal media terminal 202 may include a subwoofer located within or under the player positioning device 208, the gaming shell 204, or at another location so as to be audible to the player. The subwoofer may be utilized to generate sounds, simulate wind or vibration to a player, or for any other purpose for which a subwoofer is suitable. For example, the subwoofer may be utilized to push a gush of air along the player's neck without making an audible sound.

The multi-level gaming structure 200 may include an overflow area 220 for accommodating extra players when all of the personal media terminals 202 are occupied. The overflow area 220 may include personal headphones 224 and may be adapted to allow a handheld gaming machine 110 to be connected. The multi-level gaming structure 200 may include a community display 228 such as a plasma display, liquid crystal display (LCD), a projection device and screen, or any other suitable display capable of presenting an image to a plurality of players.

Where a community display 228 is utilized, the audio output differs for each of the personal media terminals 202 due to the location of the personal media terminals 202 with respect to the community display 228. For example, if a noise-making image were to move from right to left across the community display 228, the players at the personal media terminals 202 on the right side of the multi-level gaming structure 200 would hear the sound move from their right to their left sooner than the players on the left side of the structure. The multi-level gaming structure 200 is scalable and the personal media terminals 202 may be moved, added, rotated, etc. throughout a room or environment. When a personal media terminal 202 is moved or added, a determination is made as to the new position of the personal media terminal 202 relative to the community display 228 (if present). This position information may then be used to adjust the personalized sound field accordingly.

Figure 5:
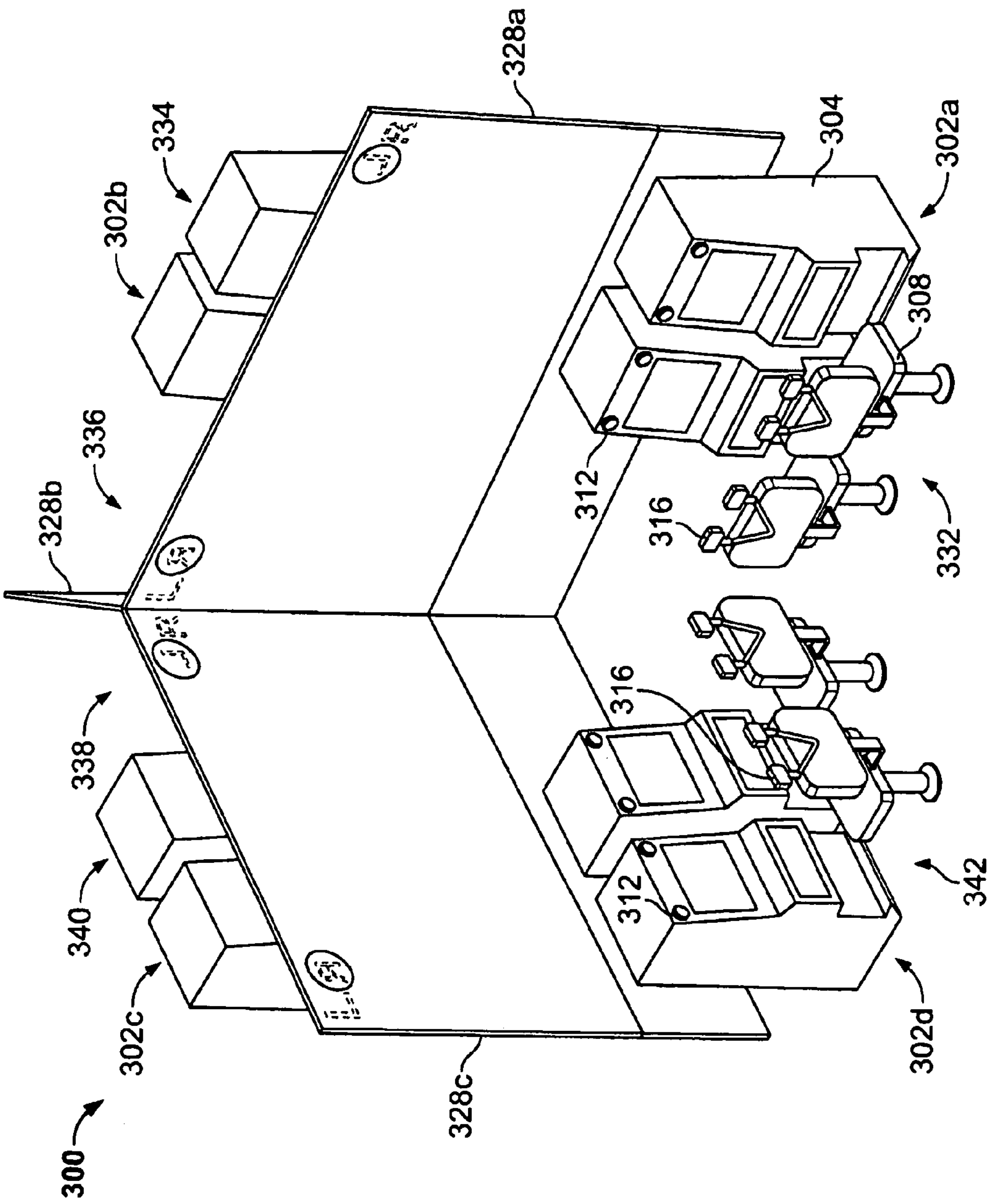
FIG. 5 is a perspective view of a 360-degree gaming structure, according to one embodiment of the present invention.

Turning now to FIG. 5, a 360-degree gaming structure 300 is illustrated, according to one embodiment of the present invention. The 360-degree gaming structure 300 includes a plurality of personal media terminals 302*a-d* located in groups around three transmissive displays 328*a-c*. Each of the personal media terminals 302*a-d* include at least two front speakers 312 and at least two rear speakers 316 adapted to personalize the audio of the personal media terminals 302*a-d* to the player utilizing the terminals. The personal media terminals 302*a-d* include a gaming machine 304 (or a gaming shell) and an associated player positioning device 308.

As illustrated, a first group 332 having two personal media terminals 302*a* is located across the transmissive display 328*a* from a second group 334 of terminals 302*b*. The first group 332 of terminals 302*a* is next to a sixth group 342 of terminals 302*d*, which is across the transmissive display 328*c* from a fifth group 340 of terminals 302*c*. The fifth group 340 of terminals 302*c* is next to a fourth group 338 of terminals (not shown) while the second group 334 of terminals 302*b* is next to a third group 336 of terminals (not shown). The third group 336 of terminals is located across the transmissive display 328*b* from the fourth group 338 of terminals.

The transmissive displays 328*a-c* are configured such that the right side of the display 328*a*, as viewed by the first group 332, is the left side of the display 328*a*, as viewed by the second group 334. Thus, when a game screen is displayed on the transmissive display 328*a*, the game screen viewed by the first group 332 is a mirror image of the game screen viewed by the second group 334. In alternative embodiments, back-to-back standard displays may be used in place of one or more of the transmissive displays 328*a-c*. For information regarding the use of transmissive display technology in gaming machines and for embodiments employing transmissive displays, the reader is referred to commonly assigned U.S. Published Application No. 20040198485, titled “Gaming Machine with Superimposed Display Image,” filed on Nov. 7, 2003, and also to commonly assigned U.S. Pat. No. 6,517,433, titled “Reel Spinning slot Machine With Superimposed Video Image,” issued on Feb. 11, 2003, each of which is incorporated herein by reference in its entirety.

As should be apparent from the above embodiments, the personal media terminals may be placed in any number of rows and columns. The personal media terminals may be directly aligned with one another or may be offset for easier viewing of a community display. The personal media terminals can be on a plurality of levels relative to one another. As desired, personal media terminals may be added, removed, or relocated to accommodate a player or owner’s needs.

As illustrated in FIGS. 3-5, the pair of front speakers 212, 312 is located on the gaming shell 204 or the gaming machine 304 while the pair of rear speakers 216, 316 is located on the player positioning device 208, 308 itself. The speaker arrangement is adapted to emit multi-channel audio associated with a wagering game in surround sound relative to a player at the personal media terminal 202, 302. Surround sound refers to the use of sound to envelop the player, making the player feel like he or she is in the middle of the action. The multi-channel audio allows the player to hear sounds coming from all around the player, thus enhancing the player’s enjoyment and causing the player to become captivated in the gaming experience.

There are several embodiments of the front speaker arrangement. In one embodiment shown in FIGS. 3-4, the front speaker arrangement includes a left speaker and a right speaker mounted within a cabinet of the personal media terminal 202, 302. In an alternative embodiment, the front speaker arrangement includes a left speaker, a right speaker, and a center speaker. Similarly, the rear speaker arrangement may include a central speaker. Additional front and/or rear speakers may be provided with the personal media terminal. Additionally, speakers may be positioned through the gaming structure itself.

As discussed above, a variety of different speaker configurations may be utilized in accord with the present invention. For example, in FIG. 6, the surround sound speaker arrangement includes a rear left speaker 350*a*, a rear right speaker 352*a*, and an optional rear center speaker generally behind a player 356 at the personal media terminal 202*a*. The rear left and rear right speakers 350*a* and 352*a* are mounted within a second personal media terminal 202*b* behind the first personal media terminal 202*a*. In the multi-level gaming structure 200, the rear left and rear right speakers 350*a* and 352*a* may be placed at the players level or may be “aimed” toward the player to provide that player with surround sound. In a reciprocal manner, speakers 250*b* and 252*b* (and an optional rear center speaker) are mounted within the personal media terminal 202*a* for use by another personal media terminal (not shown) positioned in front of the personal media terminal 202*a*. If the speakers are wireless, the personal media terminals 202*a-b* may be outfitted with wireless transmitters for communicating audio signals to the speakers.

Figure 7:
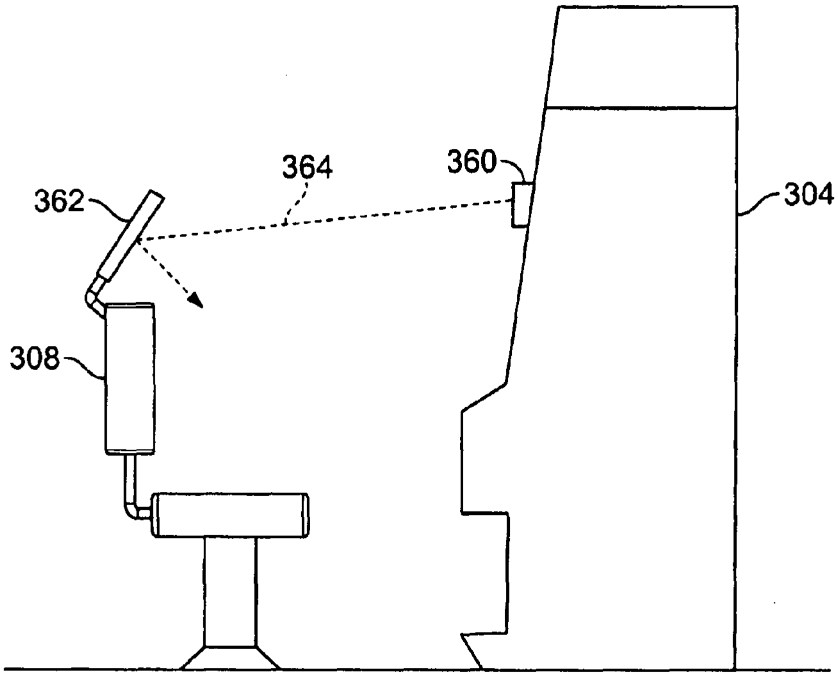
FIG. 7 is a side view of a personal media terminal, according to another embodiment.
Figure 8:
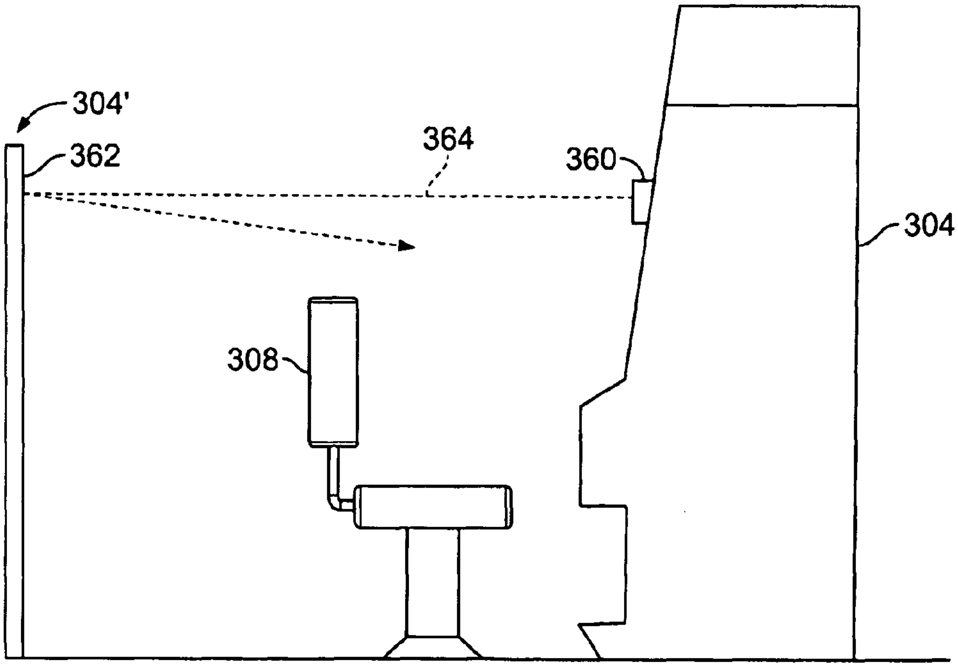
FIG. 8 is a side view of a personal medial terminal, according to still another embodiment of the present invention.

In another embodiment, shown in FIGS. 7 and 8, the surround sound speaker arrangement includes two or more front speakers 360 (in addition to front speakers 212) and a remote reflective surface 362 behind or to the sides of the player. The reflective surface 362 may, for example, be mounted to the player positioning device 308 as shown in FIG. 7. Alternatively, a reflective surface 362 may be provided on a structure behind the player positioning device 308 (e.g., another gaming machine 304'), as illustrated in FIG. 8. The speakers 360 aim concentrated sound beams 364 at the reflective surface 362. The player hears the reflected sound and perceives the sound as coming from behind him or her. Further details concerning this “virtual” speaker technology may be obtained from U.S. Pat. No. 6,229,899 to Norris et al., which is incorporated herein by reference in its entirety.

The speakers in the above embodiments generally provide full frequency response (e.g., from 20 Hz to 20,000 Hz). In addition to these speakers, the speaker arrangement may include another speaker, such as a subwoofer, dedicated to lower frequency effects (e.g., 20 Hz to 120 Hz). The subwoofer may be placed anywhere near the personal media terminal.

DOLBY DIGITAL™ (formerly Dolby AC-3) by Dolby Laboratories, Inc. is a digital surround sound format suitable for presenting audio data. DOLBY DIGITAL™ provides up to five discrete (independent) channels of full frequency effects (e.g., from 20 Hz to 20,000 Hz), plus an optional sixth channel dedicated to low frequency effects (e.g., from 20 Hz to 120 Hz). The five discrete channels include front center, front left, front right, surround left, and surround right. The center, front-left, and front-right channels generally carry dialogue, music, and sound effects, while the surround left and surround right channels provide surround sound and ambient effects. The sixth channel is usually reserved for a subwoofer speaker for reproducing the low frequency effects that may come with certain wagering games. During production, the audio data is stored in DOLBY DIGITAL™ format, i.e., as compressed and encoded digital data. The stored digital data is encoded with information indicating the data stream to be transmitted through each sound channel. A digital surround sound decoder may be provided that, during playback, decodes the stored digital data into multiple data streams transmitted through the sound channels.

An extended surround version of DOLBY DIGITAL™, called DOLBY DIGITAL EX™ or SURROUND EX™, encodes the audio data with a third surround channel (i.e., surround back channel) that can be decoded for playback over a rear center speaker placed behind the player. Using matrix encoding technology, the surround back channel information is encoded into the surround left and right channels during production and later decoded (or derived) from the surround left and right channels during playback. Because of this matrix encoding scheme, the surround back channel is not a true discrete channel. This allows certain audio effects to be presented behind the player, thereby achieving more enveloping and complete 360-degree surround sound.

DTS DIGITAL SURROUND™ by Digital Theatre Systems, Inc. is a competing and alternative digital surround sound format to DOLBY DIGITAL™. Like DOLBY DIGITAL™, DTS DIGITAL SURROUND™ provides up to five discrete channels of full frequency effects, plus an optional sixth channel dedicated to low frequency effects. DTS DIGITAL SURROUND™, however, offers higher data rates, and therefore uses more memory capacity than DOLBY DIGITAL™.

An extended surround version of DTS DIGITAL SURROUND™, called DTS-ES MATRIX™, encodes the audio data with a third surround channel (i.e., surround back channel) that can be decoded for playback over a rear center speaker placed behind the player. Yet another extended surround version of DTS DIGITAL SURROUND™, called DTS-ES DISCRETE 6.1™, supports a fully discrete surround back channel. That is, the surround back channel has it own data stream and is truly independent from those of the surround left and right channels.

The above-described gaming structures 200, 300 may be utilized to play a variety of wagering games or games of skill. According to one embodiment, the community display is utilized to display a wagering game including a single play field and a plurality of movable game pieces. The game pieces are associated with the respective personal media terminals. In response to a wager placed at one of the personal media terminals, the game piece associated with that terminal moves along or near the play field and generates a game outcome. The game outcome may be defined by the game piece itself or the location where the game piece lands on the play field. The game awards a payoff if the game outcome meets winning criteria. The wager placed at the one of the personal media terminals is independent of any other wagers placed at the other terminals and is independent of when the other wagers are placed. Similarly, the game piece associated with the player's terminal operates independent of the game pieces associated with the other players' terminals. There is no actual player-to-player interaction—the players merely make use of the same play field. Therefore, the gaming structure allows players to join the wagering game at any time and to place wagers, make any necessary selections, and play the game at their own pace. This method of playing a wagering game is further described in commonly assigned U.S. Pat. No. 6,364,314 titled "Multi-player Gaming Platform Allowing Independent Play on Common Visual Display," issued on Apr. 2, 2002, which is incorporated herein by reference in its entirety.

According to another embodiment, a player provides a wager upon entering the gaming structure. The wagering game features a mini-movie or other type of audio-visual story being displayed on a community display. Over the course of the story, several random events occur on which the player must select an outcome (e.g., A or B). If the player selects correctly, the player receives an award. For example, the story may be a CLUE® type game and the correct selection of a person, weapon, or room might result in an award. In some embodiments, the player's award increases exponentially as the player correctly selects the outcome of the random events. In other embodiments, the audio-visual display may be sports based and the random events may include the result of a particular play.

The above wagering games may provide an award value based on the overall position of an individual player within a group of player's in the gaming structure during the wagering game. Alternatively, the award may be paid to the last player standing (i.e., a predetermined number of incorrect selections eliminate a player from contending for an award).

According to another embodiment, the wagering game might be a slots tournament, a poker tournament, or the like. The community display may then be used to display the standings of the individual players during the tournament. In some embodiments, the personal media terminal is provided with a camera facing the player positioning device. The camera may be used to record or photograph the player over the course of the event. The recording or photographs may then be randomly displayed on the community display over the course of the tournament. If a player were to hit a large award or special event, the recording could be used for an instant replay of the win. Alternatively, the recording or photograph may be utilized to show players reactions as they are eliminated from the tournament.

In one embodiment of the present invention, a slots game is conducted wherein each personal media terminal has an associated symbol that may be displayed on the community display. If the associated symbol appears on the display along a payline on which the player at the associated terminal wagered, the player may be provided with a special award, such as a progressive award.

The wagering game may be a BATTLESHIP® type game, wherein the personal media terminals are associated with a position on a displayed game board. The association between the personal media terminals and the displayed game board may be a direct representation of the game board or the personal media terminals may be randomly associated with a position on the game board. Which of the personal media terminals is associated with which position on the game board may be known or unknown to the players. A player may place a wager and select one of the locations on the displayed game board. In some embodiments, if the selected location results in a "hit" of a "ship," the speakers (and typically a subwoofer) activate on the associated personal media terminal. This results in an audio sound and may also include the rumbling or vibrating of the personal media terminal as well.

According to one embodiment, the above BATTLESHIP® type game is played between two different gaming structures. A first group of players within a first structure take their seats in various personal media terminals and are considered to be the "ships" for their board. The rest of the personal media terminals in the first structure remain vacant. Likewise a second group of players within a second structure take their seats. The two groups take turns selecting positions on the board until each of the "ships" in the other structure are destroyed. As a player selects a position, the speakers (and typically a subwoofer) activate on the associated personal media terminal in the other gaming structure. Thus, the players in this structure get to determine the general location of the selection and begin to become excited as the selections become close to there position.

In still another embodiment of the present invention, the community display may include a plurality of screens, with a different screen for each of the plurality of personal media terminals. The community display may be provided with an extremely high refresh rate (e.g., 600 Hz) causing the various screens to be indecipherable to the human eye. Each personal media terminal may include a shuttered lens that would allow a player to view their designated screen from among the plurality of game screens.

In one embodiment, the shuttered lens might include a color filter that allows a player to see certain aspects of a game screen, but not others. For example, the color filter might allow a player to see his "hole cards" is a game of Texas Hold 'Em without being able to see the remaining players' cards. The five community cards would be visible to all of the players as they are revealed. By utilizing a colored lens and shutter system, the operator can ensure that the players do not remove their color filters to view the entire board (if they did they would not be able to see anything because of the high refresh, rate), while at the same time not requiring the operator to adjust each of the shutter speeds on the various lens to a particular user.

Each of these embodiments and obvious variations thereof is contemplated as falling within the spirit and scope of the claimed invention, which is set forth in the following claims.

What is claimed is:

1. A gaming system comprising:
at least one community display adapted to display a community event thereon; and
a plurality of personal media terminals having a player positioning device and a plurality of speakers, at least two of the plurality of speakers being positioned to provide frontal audio to the player positioning device and at least two of the plurality of speakers being positioned to provide rear audio to the player positioning device, the plurality of speakers being positioned so as to provide a 360-degree sound field relative to the player positioning device,
wherein the 360-degree sound field for each of the plurality of personal media terminals differs based on the location of the personal media terminal in relation to the community display.

2. The gaming system of claim 1, wherein the personal media terminal includes a gaming machine.

3. The gaming system of claim 1, wherein the personal media terminal includes a gaming shell.

4. The gaming system of claim 1, wherein the plurality of personal media terminals are located on a plurality of levels relative to one another.

5. The gaming system of claim 1, wherein the plurality of speakers for each of the personal media terminals includes a subwoofer, the subwoofer being adapted to vibrate the player positioning device.

6. The gaming system of claim 1, wherein the personal media terminal is adapted to communicate with a wireless gaming machine.

7. The gaming system of claim 1, wherein at least one community display is a plurality of community displays, the plurality of personal media terminals being located in a substantially 360-degree configuration around the plurality of community displays.

8. The gaming system of claim 1, wherein the at least one community display is a transmissive display.

9. The gaming system of claim 8, wherein the plurality of personal media terminals are located on opposite sides of the transmissive display.

10. The gaming system of claim 1, wherein the two or more speakers positioned to provide rear audio are located in front of the player positioning device, a reflective surface being located behind the player positioning device, the reflective surface being adapted to reflect sound beams from the two or more speakers back towards the player positioning device.

11. A gaming system comprising:
at least one community display adapted to display a community event thereon; and
a plurality of personal media terminals located in a plurality of rows facing the at least one community display, the personal media terminals including a player interface for interacting with the community event, each of the personal media terminals having personalized audio based on the location of the personal media terminal relative to the at least one community display.

12. The gaming system of claim 11, wherein the player interface is a handheld gaming machine adapted to communicate with the personal media terminal.

13. The gaming system of claim 11, wherein the plurality of personal media terminals and the at least one community display are located within an enclosed gaming environment.

14. The gaming system of claim 13, wherein the personal media terminals are adapted to receive a wager from a player to participate in the community event.

15. The gaming system of claim 13, wherein a wager to participate in the community event is received upon entrance into the enclosed gaming environment.

16. The gaming system of claim 11, wherein each of the plurality of rows is located on a different level from the rest of the plurality of rows.

17. The gaming system of claim 11, wherein the personalized audio generates a 360-degree sound field within the personal media terminal.

18. The gaming system of claim 11, wherein the personal media terminal includes a gaming machine.

19. The gaming system of claim 11, wherein the personal media terminal includes a gaming shell.

20. A gaming system comprising:
at least one community display adapted to display a community wagering game; and
a plurality of player terminals located in a plurality of rows facing the at least one community display, the plurality of rows forming a stadium-seating arrangement relative to the community display, different rows being provided with different localized audio related to the community wagering game.

21. A gaming system comprising:
at least one community display adapted to display a community event thereon, the community event including a wagering game having a game board and a plurality of selectable locations on the game board;
a plurality of personal media terminals having a player positioning device and a plurality of speakers, each of the personal media terminals being associated with at least one of the plurality of selectable locations on the game board; and
wherein upon a selection of at least one of the plurality of selectable locations on the game board, the plurality of speakers that corresponds to the personal media terminal associated with the selected selectable location is activated.

* * * * *